(12) United States Patent
So et al.

(10) Patent No.: US 9,273,792 B2
(45) Date of Patent: Mar. 1, 2016

(54) SOLENOID VALVE WITH MAGNET FILTER

(71) Applicant: KEFICO CORPORATION, Gunpo-si, Gyeonggi-do (KR)

(72) Inventors: Byung Sam So, Yongin-si (KR); Sang Hoon Park, Pyeongtaek-si (KR); Hun Cheol Kang, Yongin-si (KR)

(73) Assignee: KEFICO CORPORATION, Gunpo-si (KR)

( * ) Notice: Subject to any disclaimer, the term of this patent is extended or adjusted under 35 U.S.C. 154(b) by 303 days.

(21) Appl. No.: 13/870,885

(22) Filed: Apr. 25, 2013

(65) Prior Publication Data

US 2014/0318649 A1   Oct. 30, 2014

(51) Int. Cl.
*F16K 31/06* (2006.01)
*F16K 51/00* (2006.01)

(52) U.S. Cl.
CPC ......... *F16K 31/0668* (2013.01); *F16K 31/0606* (2013.01); *F16K 31/0613* (2013.01); *F16K 31/0675* (2013.01); *F16K 51/00* (2013.01); *Y10T 137/87362* (2015.04)

(58) Field of Classification Search
CPC ... B01D 35/06; B01D 35/157; B01D 35/1573
USPC ........................... 137/550; 210/222, 223, 695; 251/129.15
See application file for complete search history.

(56) References Cited

U.S. PATENT DOCUMENTS

| | | | | |
|---|---|---|---|---|
| 2,996,162 | A * | 8/1961 | Lehde | 192/21.5 |
| 3,245,424 | A * | 4/1966 | Olsen | 137/85 |
| 4,689,144 | A * | 8/1987 | Holmes | 210/130 |
| 5,121,769 | A * | 6/1992 | McCabe et al. | 137/625.61 |
| 5,342,025 | A * | 8/1994 | Hwang | 251/65 |
| 6,576,128 | B1 * | 6/2003 | Jackson | 210/223 |
| 2003/0116493 | A1 * | 6/2003 | Elsegood | 210/222 |
| 2006/0158292 | A1 * | 7/2006 | Ugai et al. | 335/302 |
| 2008/0038126 | A1 * | 2/2008 | Berroth | 417/420 |
| 2008/0218160 | A1 * | 9/2008 | Tsuchida et al. | 324/207.25 |
| 2008/0258090 | A1 * | 10/2008 | Najmolhoda et al. | 251/129.15 |
| 2009/0206021 | A1 * | 8/2009 | Davies | 210/232 |
| 2013/0105379 | A1 * | 5/2013 | Lee | 210/222 |

FOREIGN PATENT DOCUMENTS

KR    10-0903834 B1    6/2009

* cited by examiner

*Primary Examiner* — Craig Schneider
*Assistant Examiner* — Angelisa L Hicks
(74) *Attorney, Agent, or Firm* — Knobbe Martens Olson & Bear LLP

(57) ABSTRACT

A solenoid valve with the magnet filter includes a flange having a guide hollow part formed therein, in which at least one port that communicates with the guide hollow part is formed on an outer circumferential surface of the flange to be spaced apart from each other by a predetermined distance in a lengthwise direction; a spool that is slidably installed in the guide hollow part; and a driving unit that is installed at a lower end of the spool and allows the spool to slide along the guide hollow part by a supply of current, wherein a bypass flow passage is formed in the driving unit so that bypass of oil or air is performed, and a magnet filter is installed at one side of the bypass flow passage so as to prevent introduction of metallic foreign substances.

4 Claims, 7 Drawing Sheets

SOLENOID VALVE WITH MAGNET FILTER

BACKGROUND

1. Field

The present disclosure relates to a solenoid valve, and more particularly, a solenoid valve with a magnet filter in which the magnet filter is installed at one side of a bypass flow passage of the solenoid valve so that the introduction of metallic foreign substances may be prevented.

2. Description of the Related Art

A general internal combustion engine for a vehicle requires stronger torque and low rotation speed when starting to drive and requires higher rotation speed than torque so as to increase driving speed.

Thus, in order to maintain rotation of an engine at constant speed, a transmission serves to reduce rotation speed and simultaneously to increase torque using gears when the engine starts to drive and to increase rotation speed when driving speed need to be increased.

Such a transmission includes a manual transmission that a user manipulates directly a clutch and an automatic transmission that can automatically change gears using hydraulic pressure as the vehicle moves.

A solenoid valve that controls a clutch by lowly reduced control pressure (for example, 5 to 7 bar) is mainly used as an automatic transmission according to the related art.

FIG. 1 is a cross-sectional view of a solenoid valve disclosed in Korean Patent Registration No. 10-0903834 (Patent literature 1).

As illustrated in FIG. 1, a solenoid valve 10 according to the related art includes a flange 20 having a guide hollow part 21 formed therein, a feedback chamber 22, a supply chamber 23, a control chamber 24, and a discharge chamber 25 being formed in the guide hollow part 21, a spool 30 that is movably installed in the guide hollow part 21 of the flange 20 and has one or more ring-shaped grooves 31a and 31b, and a driving unit 40 that drives the spool 30.

A feedback port 22a, a supply port 23a, a control port 24a, and a discharge port 25a are formed on an outer circumferential surface of the flange 20 and are spaced apart from each other by a predetermined distance in a lengthwise direction. They communicate with the feedback chamber 22, the supply chamber 23, the control chamber 24, and the discharge chamber 25.

A plurality of land parts 32a, 32b, and 32c, of which widths are increased, are formed on an outer circumferential surface of the spool 30 and are spaced apart from each other by a predetermined distance in the lengthwise direction due to the ring-shaped grooves 31a and 31b. The plurality of land parts 32a, 32b, and 32c open/close the above-described ports 22a to 25a when the spool 30 moves due to the driving unit 40.

An external hydraulic pressure supply source (for example, a hydraulic pressure pump) is connected to the supply port 23a and supplies hydraulic pressure into the flange 20. The control port 24a is connected to a clutch (not shown) of a transmission so as to supply control pressure to the clutch (not shown) of the transmission, thereby controlling the pressure of the clutch. Pressure that remains in the solenoid valve 10 is discharged through the discharge port 25a.

Meanwhile, the driving unit 40 includes a bobbin 42 on which coils 41 are wound, a housing 43 that surrounds an outer circumferential surface of the bobbin 42, an amateur 44 that is installed at an inner diameter part of the bobbin 42 to be movable in a vertical direction, a spindle 45 that is fixed to a center of the amateur 44 and contacts a lower end of the spool 30, a core 46 that is disposed on one end of the amateur 44, a pole 47 that is disposed on the other end of the amateur 44, and a terminal part 48 that is connected to the bobbin 42.

In the solenoid valve 10 according to the related art, no bypass flow passage is formed in the driving unit 40. Thus, the degree of precision of hydraulic pressure performance is lowered, hysteresis characteristics are irregular and thus it is difficult to precisely control hydraulic pressure when gears are shifted using a transmission.

Thus, a bypass flow passage that communicates an inner side of the driving unit 40 and an outer side of the solenoid valve 10 need to be formed. In this case, foreign substances may be introduced into the driving unit 40 via the bypass flow passage.

In particular, since the amateur 44 and the spindle 45 slide within the driving unit 40 by a magnetic force, when metallic foreign substances, such as chips as a component of the transmission or belt abrasion materials, are introduced into the driving unit 40, precise hydraulic pressure control cannot be performed due to abnormal movement of the amateur 44, and shock may occur during shifting gears or shifting gears is not performed.

SUMMARY

One aspect of the present invention provides a solenoid valve with a magnet filter in which a bypass flow passage is formed in a driving unit, the magnet filter is disposed at one side of the bypass flow passage so that the introduction of metallic foreign substances may be prevented.

According to an aspect of the present invention, there is provided a solenoid valve with a magnet filter, including: a flange having a guide hollow part formed therein, in which at least one port that communicates with the guide hollow part is formed on an outer circumferential surface of the flange to be spaced apart from each other by a predetermined distance in a lengthwise direction; a spool that is slidably installed in the guide hollow part; and a driving unit that is installed at a lower end of the spool and allows the spool to slide along the guide hollow part by a supply of current, wherein a bypass flow passage is formed in the driving unit so that bypass of oil or air is performed, and a magnet filter is installed at one side of the bypass flow passage so as to prevent introduction of metallic foreign substances.

A through hole that communicates with the bypass flow passage may be formed in one side of a coupling part of a lower end of the flange, and a mounting groove which communicates with the through hole and on which the magnet filter is mounted may be formed in a lower end of the coupling part.

The driving unit may include: a housing that has a space part formed therein and is coupled to the lower end of the flange; and a core that is accommodated in the housing and is disposed on a lower end of the coupling part of the flange, and wherein the magnet filter is interposed between the coupling part and the core.

The magnet filter may include: a ring-shaped case having at least one protrusion on an upper end and a lower end of the case; and a ring magnet accommodated in the case.

An accommodation groove may be formed in a stepped manner along an edge of an inner diameter of the case, and the ring magnet may be accommodated in the accommodation groove.

At least one coupling protrusion may be formed on the accommodation groove to be spaced apart from each other by a predetermined distance in a circumferential direction, and at least one coupling groove corresponding to the at least one coupling protrusion may be formed in the ring magnet.

The case may be formed integrally with the ring magnet using injection molding or may be manufactured using rubber forming.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS

Figure 1:
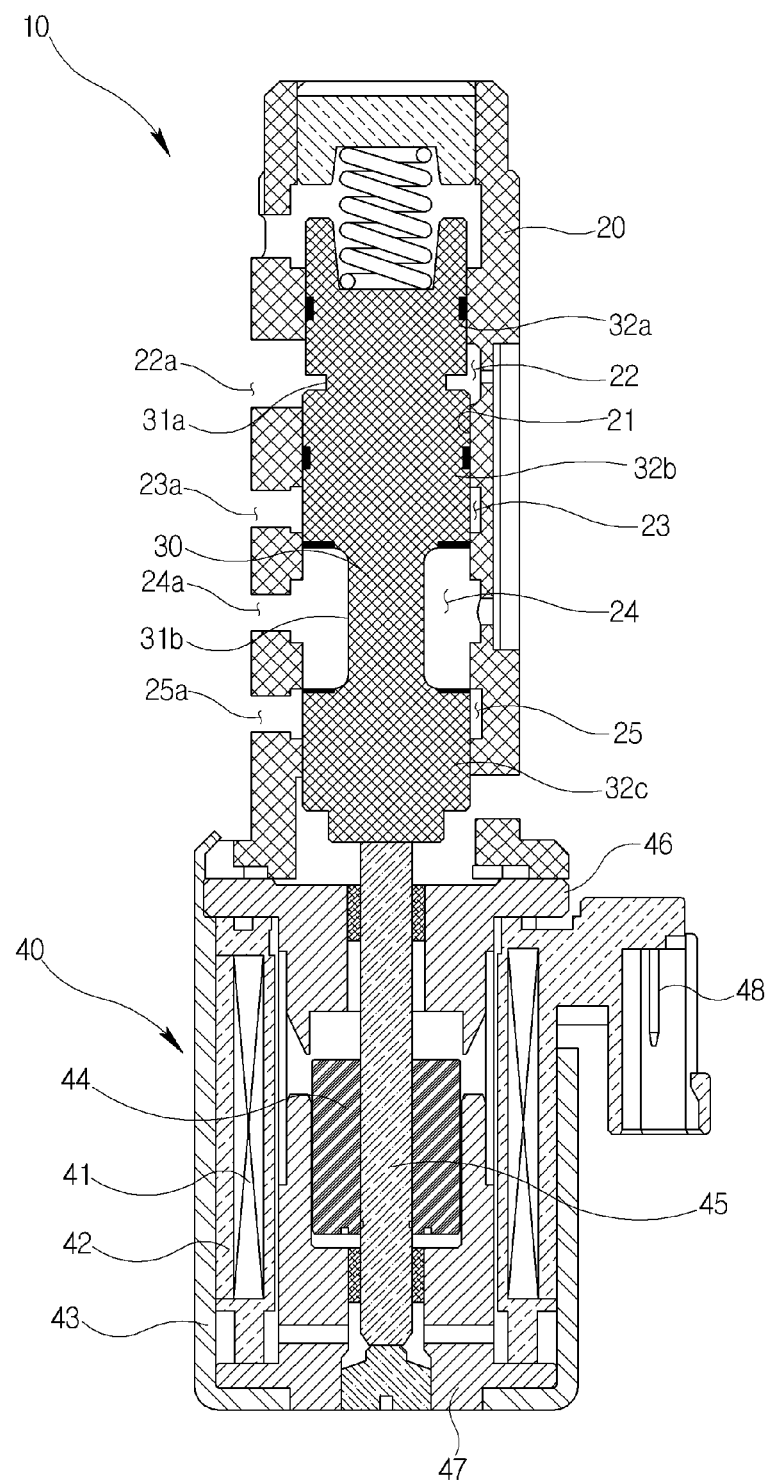
FIG. 1 is a cross-sectional view of a solenoid valve according to the related art.

Hereinafter, a solenoid valve with a magnet filter according to the present invention will now be described more fully with reference to the accompanying drawings, in which exemplary embodiments of the invention are shown. In the drawings, the thicknesses of lines and the sizes of elements are exaggerated for clarity and conveniences.

Also, the following terms are defined in consideration of functions in the present invention and may be changed according to a user or operator's intent or practice. Thus, definitions of the terms will be provided based on the description of the specification.

Furthermore, the following embodiment does not limit the right scope of the present invention but are just exemplary matters of elements represented in claims of the present invention, and an embodiment that is included in the technical spirit of the specification of the present invention and includes elements that may be substituted as an equivalent may be included in the right scope of the present invention.

Embodiments

Figure 2:
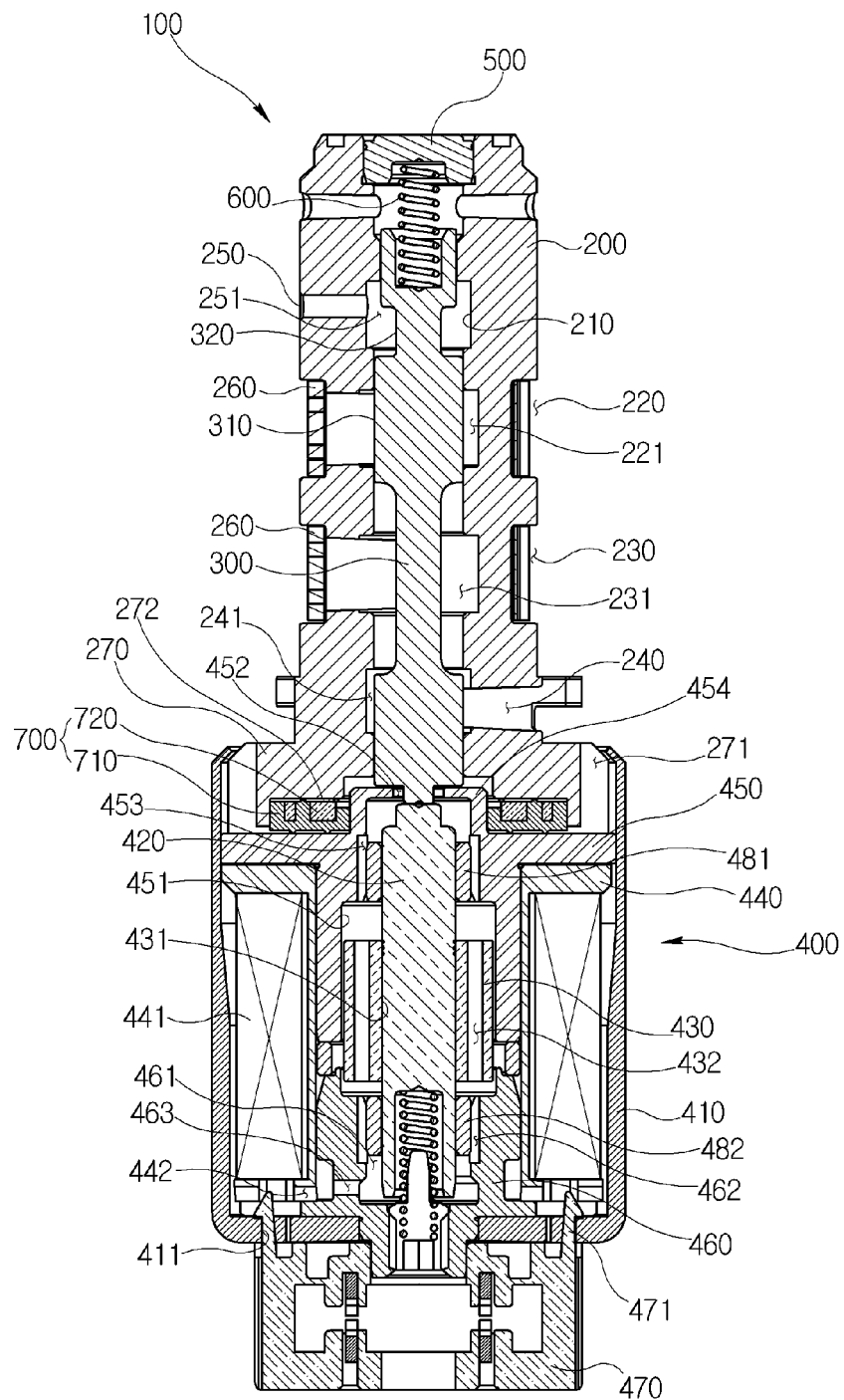
FIG. 2 is a cross-sectional view of a solenoid valve with a magnet filter, according to an embodiment of the present invention.

FIG. 2 is a cross-sectional view of a solenoid valve with a magnet filter, according to an embodiment of the present invention.

As illustrated in FIG. 2, a solenoid valve 100 with a magnet filter according to an embodiment of the present invention (hereinafter, referred to as a 'solenoid valve') includes a flange 200 having a guide hollow part 210 formed therein, a spool 300 that is slidably installed in the guide hollow part 210 of the flange 200, and a driving unit 400 that is installed at a lower end of the spool 300 and allows the spool 300 to slide along the guide hollow part 210 by the supply of current.

A supply port 220, a control port 230, a discharge port 240, and a feedback port 250 are formed on an outer circumferential surface of the flange 200 and are spaced apart from each other by a predetermined distance in a lengthwise direction. The ports 220, 230, 240, and 250 communicate with the guide hollow part 210.

An external hydraulic pressure supply source (for example, a hydraulic pressure pump) (not shown) is connected to the supply port 220. The control port 230 is connected to a clutch (not shown) of a transmission so as to supply control pressure to the clutch (not shown) of the transmission, thereby controlling the pressure of the clutch, and pressure that remains in the solenoid valve 100 is discharged through the discharge port 240.

A feedback flow passage (not shown) is formed at one side of the flange 200 and connects the control port 230 and the feedback port 250. In this case, portions of control pressure discharged through the control port 230 are introduced through the feedback port 250 and are exerted as feedback pressure on the spool 300.

A plurality of land parts 310, of which widths are increased, are formed on an outer circumferential surface of the spool 300 and are spaced apart from each other by a predetermined distance due to a ring-shaped groove 320. The plurality of land parts 310 serve to open/close the ports 220 to 250 when the spool 300 slides.

In the guide hollow part 210, spaces between the ports 220 to 250 and the land parts 310 on the outer circumferential surface of the spool 300 constitute a supply chamber 221, a control chamber 231, a discharge chamber 241, and a feedback chamber 251. Thus, hydraulic pressure supplied through the supply port 220 is introduced into the supply chamber 221 and then moves to the control chamber 231 when the spool 300 moves upward (in the drawing) and is exerted as control pressure on the clutch through the control port 230. In this case, portions of control pressure are introduced into the feedback chamber 251 through the feedback flow passage (not shown), and feedback pressure is exerted on the spool 300 downward (in the drawing) due to a difference between areas of the land parts 310.

A stopper 500 is coupled to an upper end of the guide hollow part 210. A return spring 600 is interposed between a lower end of the stopper 500 and an upper end of the spool 300. The return spring 600 absorbs shock when the spool 300 moves upward and provides an elastic force to the spool 300 downward.

That is, force is applied to the spool 300 in such a way that the spool 300 returns to its initial state due to an elastic restoration force of the return spring 600 and feedback pressure through the feedback chamber 251. Linear pressure control is performed using a balance between the forces and a force applied to the spool 300 by the driving unit 400.

A steel filter 260 may be installed at the supply port 220 and the control port 230 so as to prevent the introduction of foreign substances.

The driving unit 400 includes a housing 410 that has a space part formed therein and is coupled to a coupling part 270 of a lower end of the flange 200, a spindle 420 that is disposed within the space part of the housing 410 to closely contact a lower end of the spool 300, an amateur 430 that is coupled to a hollow of the spindle 420, a bobbin 440 having an outer circumferential surface on which coils 441 are wound, while surrounding the amateur 430, a core 450 that is disposed between a top surface of the bobbin 440 and a bottom surface of the coupling part 270 of the flange 200 and accommodates an upper end of the amateur 430 in an inner diameter part of the core 450, and a pole (stator) 460 that is disposed at a lower end of the amateur 430 to face the core 450 and accommodates the lower end of the amateur 430 in an accommodation groove 461.

In this case, as illustrated in FIG. 2, when power is applied to the coils 441, the amateur 430 moves upward together with the spindle 420 and the spindle 420 pushes the lower end of the spool 300 so that the spool 300 may be moved upward. A connector guide 470 for power connection is disposed at a lower end of the housing 410.

In a solenoid valve according to the related art, the degree of precision for controlling an operation of the spool 300 is lowered due to a positive/negative pressure formed within the space part of the housing 410 when a valve operates, like a reciprocating motion of the amateur 430 and the spindle 420.

Thus, the solenoid valve 100 according to the current embodiment of the present invention constitutes a bypass flow passage B (See FIG. 5) in the driving unit 400 so that oil or air outside the solenoid valve 100 may pass through the driving unit 400 and bypass of oil or air may be performed, thereby preventing a positive/negative pressure in the space part of the housing 410 when the valve operates.

To this end, a through hole 271 is formed in the coupling part of the flange 200, and the bypass flow passage B (See FIG. 5) that communicates with the through hole 271 is formed within the driving unit 400. In this case, the through hole 271 may be formed through in a circumferential direction along an edge of the coupling part 270 of the flange 200, and at least one through hole 271 may be formed to be spaced apart from each other by a predetermined distance in the circumferential direction.

Oil or air introduced into the housing 410 through the through hole 271 flows to the inner diameter part 451 of the core 450 through a slide hole 452 provided in the middle upper end of the core 450 so that the spindle 420 may come into and go out through the slide hole 452. Subsequently, oil or air passes through a first guide groove 453 that is vertically formed in one side of the inner diameter part 451 of the core 450.

A first bushing 481 having a cylindrical shape is interposed between an outer circumferential surface of the spindle 420 and the inner diameter part 451 of the core 450 so as to prevent flow and deflection of the spindle 420. The first guide groove 453 is formed in one side of an outer circumferential surface of the first bushing 481 in the lengthwise direction. At least one first guide groove 453 may be formed to be spaced apart from each other by a predetermined distance in the circumferential direction along an edge of the first bushing 481.

The amateur 430 that is magnetic is spaced from the lower end of the first bushing 481 by a predetermined distance. The amateur 430 is inserted into and fixed to the outer circumferential surface of the spindle 420 and slides along the inner diameter part 451 of the core 450 together with the spindle 420 due to a magnetic force generated when power is supplied to the coils 441. In this case, the spindle 420 pushes the spool 300 to move it.

A guide flow passage 432 that vertically penetrates the amateur 430 is formed around a spindle assembly hole 431 of the amateur 430 so that oil or air passing through the first guide groove 453 may pass through the amateur 430 and may flow downward. In this case, the guide flow passage 432 may be formed at one side of the spindle assembly hole 431 along the circumferential direction and at least one guide flow passage 432 may be formed to be spaced apart from each other by a predetermined distance in the circumferential direction.

The pole 460 is disposed on the bottom surface of the space part of the housing 410 at the lower end of the amateur 430 so as to face the core 450. Oil or air passing through the guide flow passage 432 is introduced into the accommodation groove 461 of the pole 460 and passes through a second guide groove 462 that is vertically formed in one side of the accommodation groove 461.

A second bushing 482 is interposed between the outer circumferential surface of the spindle 420 and a sidewall of the accommodation groove 461 of the pole 460. In this case, the second guide groove 462 is formed in one side of an outer circumferential surface of the second bushing 482 in the lengthwise direction, and at least one second guide groove 462 may be formed to be spaced apart from each other by a predetermined distance along an edge of the second bushing 482.

A guide hole 463 is formed in a lower end of the sidewall of the accommodation groove 461 in a direction of radius of the accommodation groove 461. The guide hole 463 communicates with an outside o the pole 460.

Thus, oil or air that is introduced into the lower part of the accommodation groove 461 through the guide flow passage 432 and the second guide groove 462 flows to the outside of the pole 460 through the guide hole 463 and reaches the lower end of the space part of the housing 410.

Meanwhile, the connector guide 470 for power connection is coupled to an outer side of the lower end of the housing 410. In this case, a wedge-shaped hanging part 471 that protrudes from the edge of the connector guide 470 is inserted in and coupled to an insertion groove 411 provided in the lower end of the housing 410.

A connection hole 442 that communicates with the insertion groove 411 is formed in a lower end of a hollow of the bobbin 440. The connection hole 442 may be disposed to face the guide hole 463 of the pole 460. Oil or air discharged to the outside of the pole 460 through the guide hole 463 of the pole 460 flows in a direction toward the insertion groove 411 through the connection hole 442 of the bobbin 440.

A predetermined gap is formed between the hanging part 471 of the connector guide 470 and the insertion groove 411 of the housing 410. Thus, oil or air that is led to the direction of the insertion groove 411 through the connection hole 442 of the bobbin 440 flows out toward the outside of the housing 410 through the gap.

That is, the bypass flow passage formed in the driving unit 400 according to an embodiment of the present invention includes the first guide groove 453, the guide flow passage 432, the second guide groove 462, the guide hole 463, and the connection hole 442. Owing to the bypass flow passage, the space part inside the housing 410 communicates with the outside of the housing 410 so that positive/negative pressure may be prevented from being generated in the space part of the housing 410.

In the solenoid valve 100 according to an embodiment of the present invention, in order to prevent metallic foreign substances, such as chips as a component of the transmission or belt abrasion materials, from being introduced into the driving unit 400, a magnet filter 700 is interposed between the lower end of the coupling part 270 of the flange 200 and the upper end of the core 450.

To this end, a mounting groove 272 on which the magnet filter 700 is mounted is formed in the lower end of the coupling part 270 of the flange 200 to a predetermined width and a predetermined depth. When the magnet filter 700 is mounted on the mounting groove 272, a central protrusion part 454 at the upper end of the core 450 is inserted into a hollow of the magnet filter 700. In this case, a predetermined gap between an outer circumferential surface of the central protrusion part 454 and an inner circumferential surface of the hollow of the magnet filter 700 is generated, and the flow of oil or air is carried out through the gap.

Figure 3:
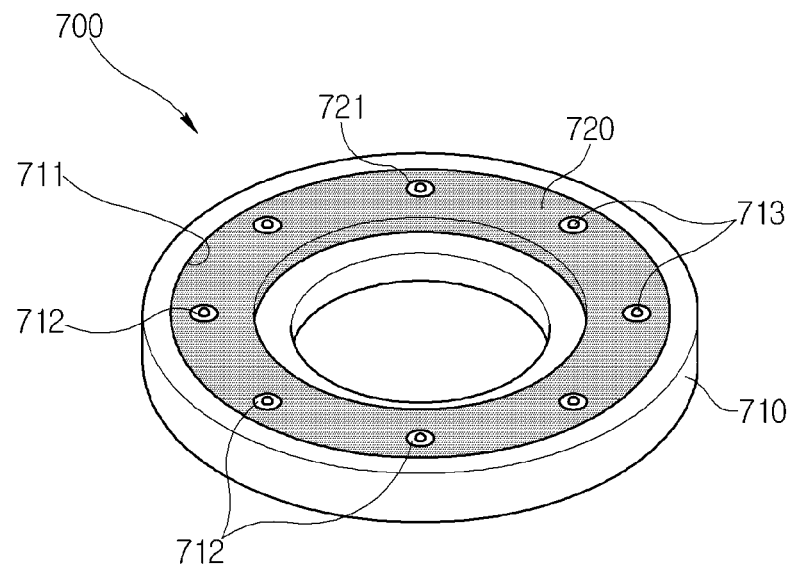
FIGS. 3 and 4 are perspective views of the magnet filter illustrated in FIG. 2.
Figure 4:
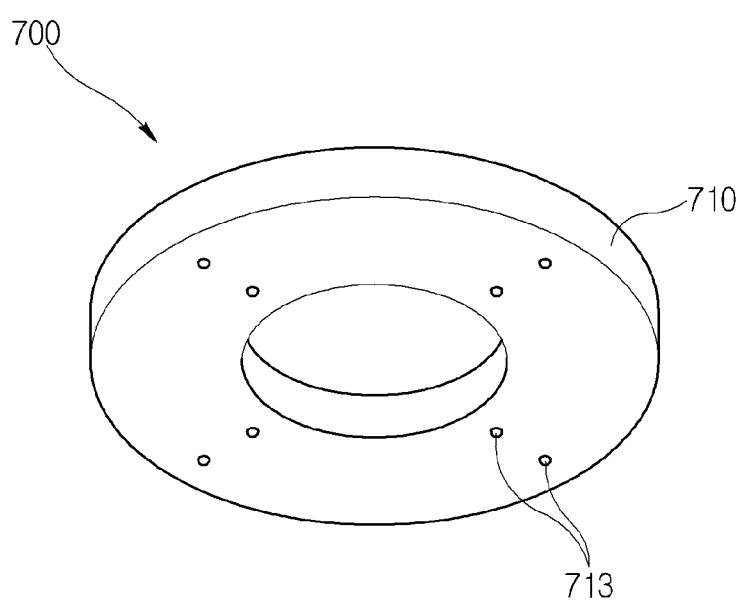

FIGS. 3 and 4 are perspective views of the magnet filter 700 illustrated in FIG. 2. In detail, FIG. 3 is a perspective view of an upper part of the magnet filter 700 of FIG. 2, and FIG. 4 is a perspective view of a lower part of the magnet filter 700 of FIG. 2.

As illustrated in FIGS. 3 and 4, the magnet filter 700 according to the current embodiment of the present invention has an overall ring shape and includes a case 710 formed of a synthetic resin or rubber and a ring magnet 720 accommodated in the case 710.

Two components may be individually manufactured and may be combined with each other so as to manufacture the case 710 and the ring magnet 720, or the case 710 and the ring magnet 720 may be formed integrally with each other by using insert injection molding.

The case 710 has an accommodation groove 711 that is formed in a stepped manner along an edge of an inner diameter of the case 710, and at least one coupling protrusion 712 is formed on the accommodation groove 711 upward to be spaced apart from each other by a predetermined distance in the circumferential direction. At least one protrusion 713 is formed on a lower end of the case 710 downward to be spaced apart from each other by a predetermined distance in the circumferential direction. In this case, the protrusion 713 is also formed on the center of the upper end of the coupling protrusion 712. The protrusion 713 that is formed on the upper end and the lower end of the case 710, respectively, prevents the flow of the case 710 when the magnet filter 700 is assembled and allows the flow of oil or air through a gap formed due to the protrusion 713.

The ring magnet 720 is a magnetic body having a ring shape, and at least one coupling groove 721 is formed through to correspond to the coupling protrusion 712 of the case 710 and to be spaced apart from each other by a predetermined distance in the circumferential direction. Thus, when the ring magnet 720 is mounted in the accommodation groove 711 of the case 710, the coupling protrusion 712 of the case 710 is inserted into the coupling groove 721 of the ring magnet 720 so that the ring magnet 720 and the case 710 may be coupled to each other and the flow of the ring magnet 720 may be prevented.

When the magnet filter 700 is mounted on the mounting groove 272 of the coupling part 270, the protrusion 713 on the upper end of the case 710 is supported on the lower end of the coupling part 270 of the flange 200. The protrusion 713 on the lower end of the case 710 is supported on the upper end of the core 450. Thus, a gap between the upper end of the magnet filter 700 and the lower end of the flange 200 and a gap between the lower end of the magnet filer 700 and the upper end of the core 450 are formed due to the protrusion 713, and the flow of oil or air may be carried out through the gap.

Figure 5:
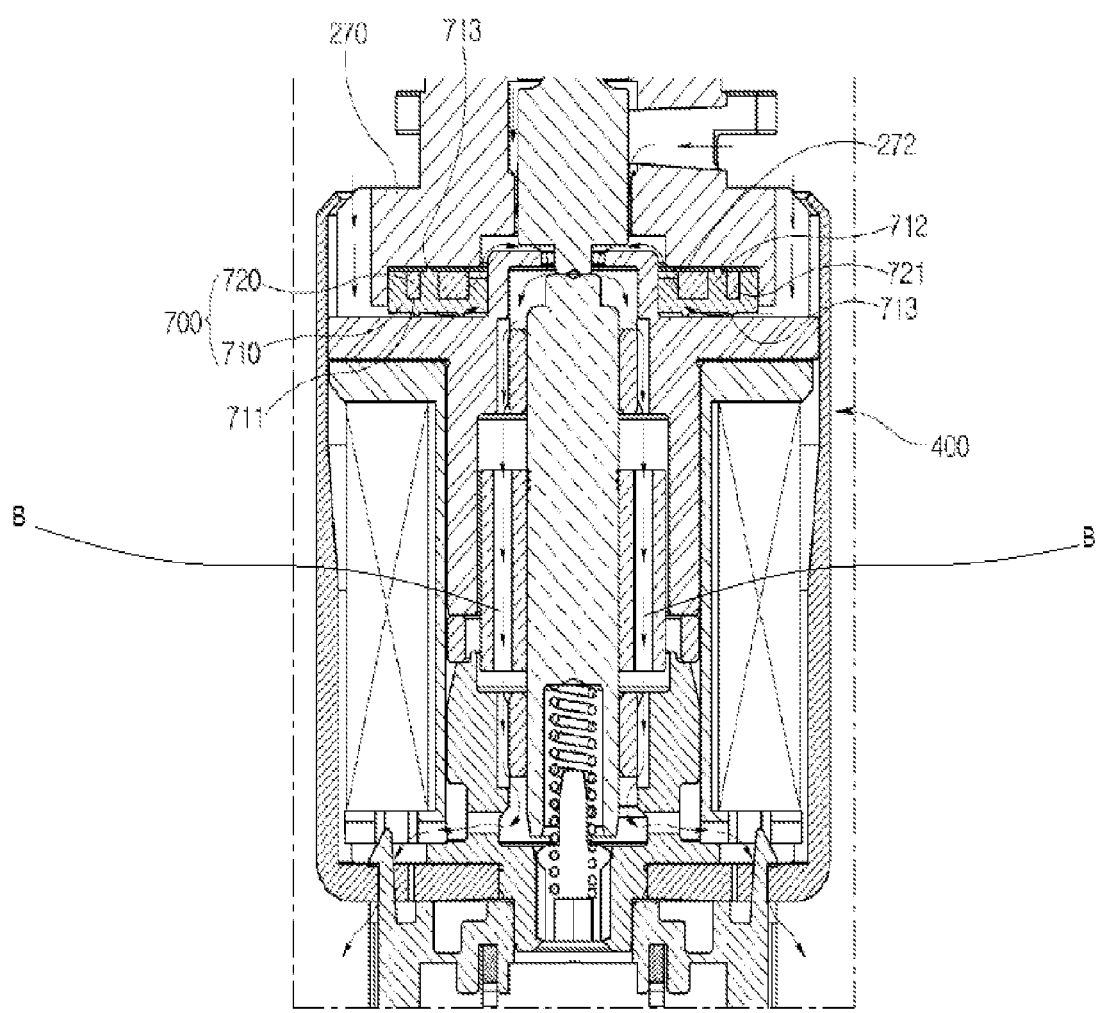
FIG. 5 is a partial enlarged view of FIG. 2.
Figure 6:
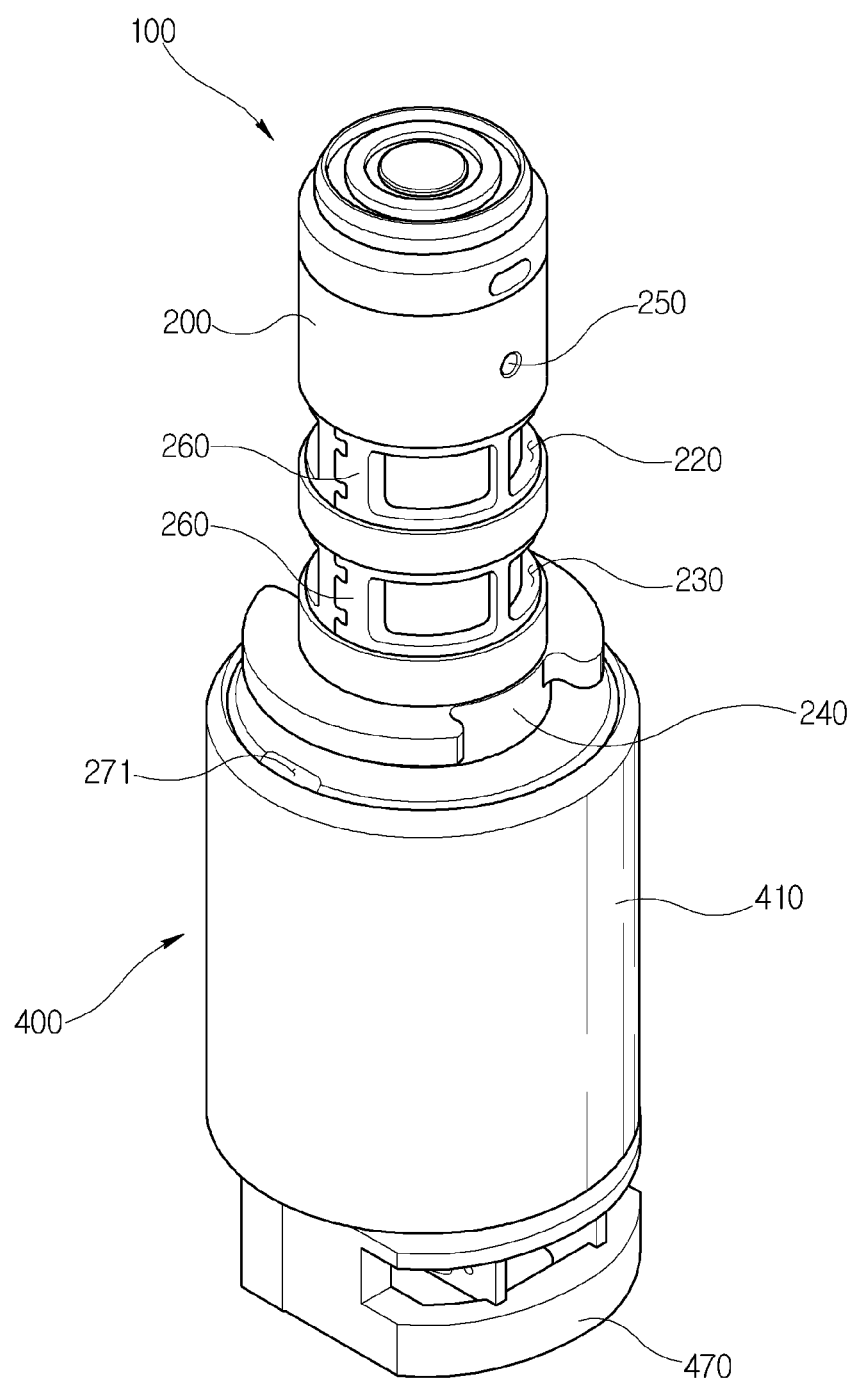
FIG. 6 is a perspective view of the solenoid valve with the magnet filter illustrated in FIG. 2.

FIG. 5 is a partial enlarged view of FIG. 2 that illustrates a bypass flow of the driving unit 400 in which the magnet filter 700 is mounted, and FIG. 6 is a perspective view of the solenoid valve 100 with the magnet filter 700 illustrated in FIG. 2.

An example in which oil or air bypasses the solenoid valve 100, will now be described with reference to FIGS. 5 and 6.

Oil or air introduced through the through hole 271 formed in the coupling part 270 of the flange 200 flows through the gap between the upper end of the magnet filter 700 and the lower end of the flange 200 or the gap between the lower end of the magnet filter 700 and the upper end of the core 450 due to the protrusion 713 of the magnet filter 700 and passes through the inner diameter of the ring magnet 720.

In this procedure, metallic foreign substances are attached to the magnet filter 700 due to a magnetic force and are removed. Metallic foreign substances that are included in oil or air introduced into the guide hollow part 210 of the flange 200 through the discharge port 240 also flow in a direction of the magnet filter 700 through the gap between the flange 200 and the spool 300 and are attached to the magnet filter 700.

Oil or air that passes through the magnet filter 700 is subsequently introduced into the inner diameter part 451 of the core 450 through the slide hole 452 of the core 450.

Oil or air introduced into the inner diameter part 451 of the core 450 flows to the lower end of the first bushing 481 through the first guide groove 453 formed in one side of the inner diameter part 451 of the core 450. Subsequently, oil or air flows to the accommodation groove 461 of the pole 460 positioned at the lower end of the amateur 430 through the guide flow passage 432 formed on the amateur 430.

Oil or air that flows to the accommodation groove 461 of the pole 460 flows to the lower end of the second bushing 482 through the second guide groove 462 formed in one side of the accommodation groove 461. Subsequently, oil or air is discharged to the outside of the housing 410 through a gap between the hanging part 471 of the connector guide 470 and the insertion groove 411 of the housing 410 via the guide hole 463 of the pole 460 and the connection hole 442 of the bobbin 440.

Figure 7:
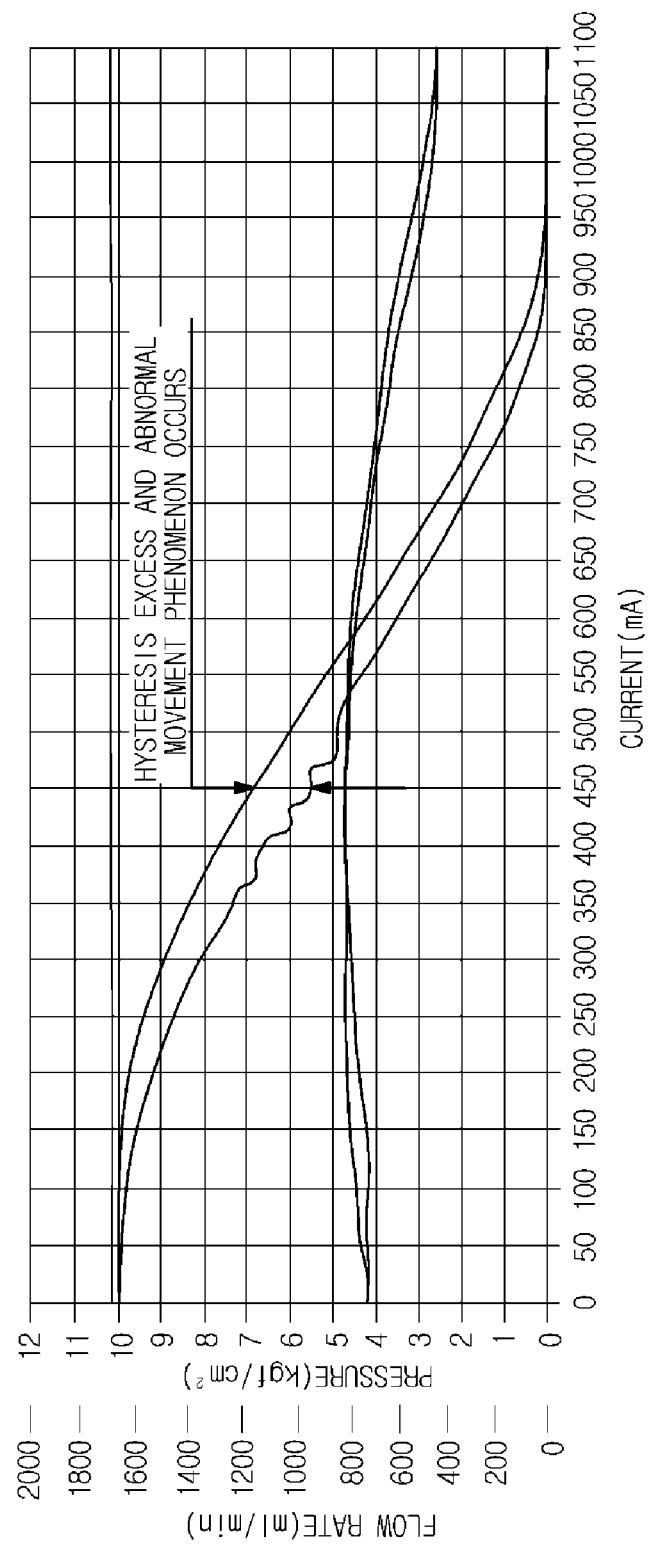
FIG. 7 is a graph showing a hysteresis curve when a solenoid valve having no magnet filter operates.
Figure 8:
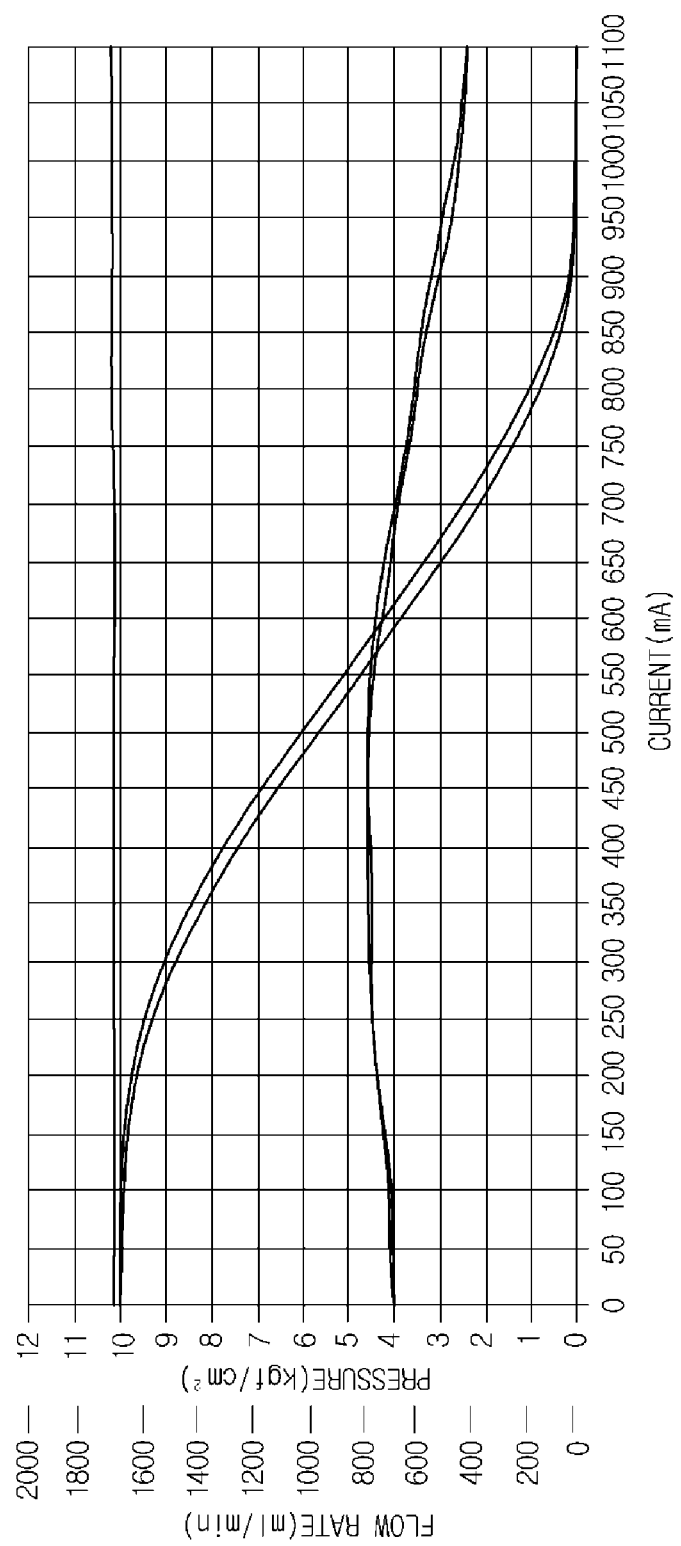
FIG. 8 is a graph showing a hysteresis curve when a solenoid valve with a magnet filter according to an embodiment of the present invention operates.

FIG. 7 is a graph showing a hysteresis curve when a solenoid valve having no magnet filter operates, and FIG. 8 is a graph showing a hysteresis curve when a solenoid valve with a magnet filter according to an embodiment of the present invention operates.

As shown in FIGS. 7 and 8, in case of a solenoid valve having no magnet filter, a hysteresis excess and abnormal movement phenomenon occurs in a hysteresis curve of hydraulic pressure performance drawn in an operating procedure. However, in case of the solenoid valve 100 with the magnet filter according to an embodiment of the present invention, hysteresis characteristics show a stable shape and thus shifting gears may be precisely controlled when shifting gears of a vehicle is performed.

In a solenoid valve with a magnet filter according to an embodiment of the present invention, metallic foreign substances may be prevented from being introduced into a driving unit of the solenoid valve so that malfunction of a valve can be prevented.

Also, when the magnet filter is mounted on a bypass flow passage, a gap between mounting surfaces is formed due to a protrusion formed on the lower end of the magnet filter so that oil or air can easily flow through the bypass flow passage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A solenoid valve with a magnet filter, comprising:
a flange having a guide hollow part formed therein, in which at least one port that communicates with the guide hollow part is formed on an outer circumferential surface of the flange to be spaced apart from each other by a predetermined distance in a lengthwise direction;
a spool that is slidably installed in the guide hollow part; and
a driving unit that is installed at a lower end of the spool and allows the spool to slide along the guide hollow part by a supply of current,
wherein a bypass flow passage is formed in the driving unit so that bypass of oil or air is performed, and a magnet filter is installed at one side of the bypass flow passage so as to prevent introduction of metallic foreign substances,
wherein the magnet filter comprises:
a ring-shaped case having at least one protrusion on an upper end and a lower end of the case; and a ring magnet accommodated in the case, wherein an accommodation groove is formed in a stepped manner on an edge of an inner diameter of the case, and the ring magnet is accommodated in the accommodation groove, and wherein at least one coupling protrusion is formed on the accommodation groove to be spaced apart from each other by a predetermined distance in a circumferential direction, and at least one coupling groove corresponding to the at least one coupling protrusion is formed in the ring magnet.

2. The solenoid valve of claim 1, wherein a through hole that communicates with the bypass flow passage is formed in one side of a coupling part of a lower end of the flange, and a mounting groove which communicates with the through hole and on which the magnet filter is mounted is formed in a lower end of the coupling part.

3. The solenoid valve of claim 2, wherein the driving unit comprises:

a housing that is coupled to the lower end of the flange; and a core that is accommodated in the housing and is disposed on a lower end of the coupling part of the flange, and wherein the magnet filter is interposed between the coupling part and the core.

4. The solenoid valve of claim 1, wherein the case is formed integrally with the ring magnet using injection molding or is manufactured using rubber forming.

* * * * *